United States Patent [19]

Fister et al.

[11] Patent Number: 4,518,058
[45] Date of Patent: May 21, 1985

[54] ENGINE TORGUE RESISTING STRUT AND VIBRATION DAMPER

[75] Inventors: Louis P. Fister, St. Louis; Herby O. Pearson, Chesterfield, both of Mo.; Lawrence H. Fitch, Cahokia, Ill.

[73] Assignee: Moog Automotive, Inc., St. Louis, Mo.

[21] Appl. No.: 332,550

[22] Filed: Dec. 21, 1981

[51] Int. Cl.³ ............................................. B60K 5/12
[52] U.S. Cl. .................................. 180/300; 180/297; 188/314; 267/8 R
[58] Field of Search .................. 267/8 R, 33, 34, 152; 180/300, 902, 299, 297, 291, 292, 312; 188/314

[56] References Cited

U.S. PATENT DOCUMENTS

| | | | |
|---|---|---|---|
| 1,714,646 | 5/1929 | Thomann | 267/8 R |
| 1,729,394 | 9/1929 | Lee | 180/299 |
| 1,829,251 | 10/1931 | Whittington | 180/299 |
| 2,044,714 | 6/1936 | Trott | 180/299 |
| 2,225,986 | 12/1940 | Glezen | 267/8 R |
| 2,557,274 | 6/1951 | Geisse | 244/103 |
| 2,774,446 | 12/1956 | De Carbon | 267/8 R |
| 2,780,427 | 2/1957 | Keller et al. | 244/83 |
| 2,818,249 | 12/1957 | Boschi | 267/33 |
| 3,037,574 | 6/1962 | Clerk | 180/300 |
| 3,229,951 | 1/1966 | Quick | 248/358 |
| 3,682,462 | 8/1972 | Papousek | 267/34 |
| 4,089,385 | 5/1978 | Payoux | 180/300 |
| 4,240,517 | 12/1980 | Harlow, Jr. et al. | 180/300 |
| 4,420,060 | 12/1983 | Kakimoto | 180/300 |

FOREIGN PATENT DOCUMENTS

| | | | |
|---|---|---|---|
| 25022 | 2/1979 | Japan | 180/300 |
| 259565 | 4/1964 | Netherlands | 188/314 |
| 515723 | 12/1939 | United Kingdom | 180/292 |
| 627738 | 8/1949 | United Kingdom | 188/292 |

*Primary Examiner*—David M. Mitchell
*Attorney, Agent, or Firm*—Gravely, Lieder & Woodruff

[57] ABSTRACT

A front wheel drive vehicle having a frame and an engine set transversely across the width of the frame, and an engine torque strut between the engine and the frame for resisting the torque reactions during engine acceleration and during vehicle forward and reverse operation, and for retaining the engine in a known position. The torque strut comprises a housing having one end pivotally attached to the engine, a piston rod at the opposite end pivotally attached to the vehicle frame, resilient means in the housing on opposite sides of a piston under a pre-load, hydraulic fluid in the housing on opposite sides of the piston, and flow control means in the strut for regulating the transfer of hydraulic fluid to opposite sides of the piston upon piston displacement in the housing, the flow control means and the resilient means damping the engine torque reactions.

10 Claims, 4 Drawing Figures

ENGINE TORQUE RESISTING STRUT AND VIBRATION DAMPER

BACKGROUND OF THE INVENTION

1. Field of the Invention

This invention relates to an improved torque strut for resisting the torque developed by a transverse mounted engine for front wheel drive vehicles and for damping engine vibrations.

2. Description of the Prior Art

In vehicles with the internal combustion engines mounted in a transverse position for front wheel drive arrangements, the engine develops a torque which tries to rotate the engine relative to the frame. The effect is most noticeable when the transmission is in either a forward or reverse mode of operation. The torque effect is extremely objectionable because it is directed in such a way as to cause the vehicle to pitch fore and aft. Therefore, it has been proposed to oppose the torque or pitching effect of a transversely mounted engine by means of a rigid strut having limited cushion effect when mounted between a suitable point on the engine or powertrain and an attachment point on the vehicle frame. The purpose for the rigid strut is to react in either tension or compression depending on whether the engine is in forward or reverse drive. One such installation is found in Harlow Jr. et al U.S. Pat. No. 4,240,517 issued Dec. 23, 1980.

It is also recognized, in some vehicle applications, to provide a vertically mounted hydraulic damper used to damp engine vibration. Another type of shock absorber, although not hydraulic in operation, embodies a plunger disc in which the motion in either direction is opposed by a coil spring so that the plunger rod connected to the piston will be opposed in its motion in either direction by one or the other of the coil springs. Such a structure is disclosed in Papousek U.S. Pat. No. 3,682,462 issued Aug. 8, 1972.

A problem with the transversely mounted engines is the necessity of an engine mounting torque strut to oppose engine pitching generated by engine torque. Such device generally could introduce undesired engine vibration into the passenger compartment. Additionally, this type of device requires flexible mounting at the engine also, where the high heat will shorten the life of the mounting. A further problem with the small front wheel drive vehicles is the space limitation in the engine compartment which does not permit additional devices to overcome the foregoing problem. Thus, a hydraulic shock absorber in conjunction with the prevailing torque strut at this location is not feasible.

BRIEF SUMMARY OF THE INVENTION

The present invention is embodied in what may be called a modified hydraulic shock absorber in which the piston movement is opposed in either direction by not only hydraulic fluid, but also by coil springs which serve to center the piston.

The engine torque resisting strut and vibration damper of the present invention comprises a housing which encloses a piston connected to a rod that projects from the housing through a suitable rod guide and seal. The opposite end of the housing is formed with a volume compensating chamber which is open to the interior of the housing through a port of predetermined size. The opposite sides of the piston are engaged by coil springs which are placed under a pre-load of substantially equal magnitude so that the piston remains in a generally centered position in the housing. The hydraulic fluid fills the housing on opposite sides of the piston, and the volume compensator chamber is sized to accommodate the volume change in the housing due to piston rod displacement.

The housing is formed with an attachment eye which is pivotally connected to an attachment point on the engine, and the piston rod is formed with a bushing and eye suitable for connection to an attachment point on the vehicle frame.

The objects of the invention are to provide a unique engine torque strut and vibration damper fully capable to resist engine torque and to damp engine vibration in a transversely mounted internal combustion engine, and to provide a torque strut and damper which has a nonresilient pivotal connection with an attachment point on the engine and is formed with a resilient bushing attachment eye for connection to the vehicle frame.

A further object is to provide a torque strut and damper constructed with means to return the engine to its original position as well as to work against engine torque to limit the degree of movement of the engine when reacting to forward or reverse operation of the transmission.

BRIEF DESCRIPTION OF THE DRAWINGS

The present torque strut and damper is illustrated in a preferred embodiment in the accompanying drawings wherein.

DETAILED DESCRIPTION OF THE EMBODIMENTS

Figure 1:
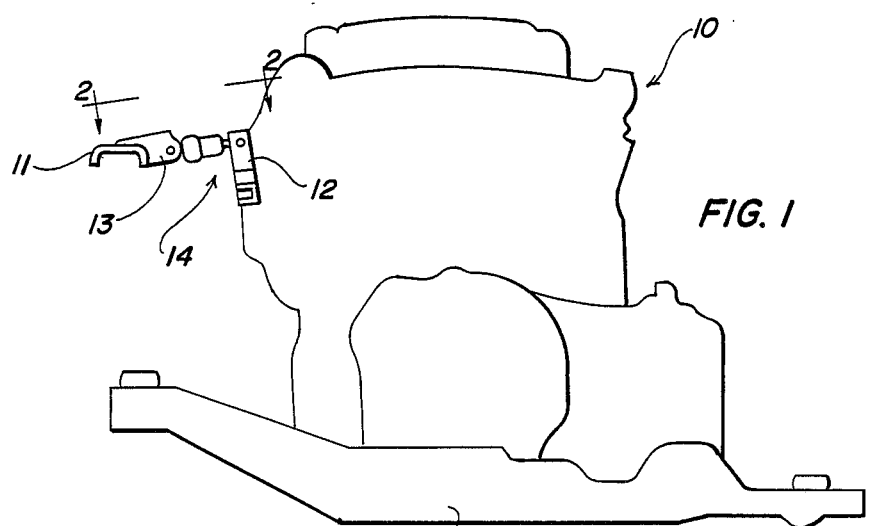
FIG. 1 is a silhouette view of a vehicle front wheel drive engine positioned transversely relative to the frame and a torque resisting strut and damper attached between the engine and the vehicle.

Referring now to the several views in the drawing, there is shown in end silhouette an internal combustion engine 10 of the type which is mounted in a vehicle frame F in a transverse position with the axis of the crankshaft directed between the front drive wheels. Forwardly of the engine 10 there is a frame member 11 which is in a position to be spaced from the area which is subjected to a large amount of engine heat. The engine block is provided with an attachment member 12 and spaced therefrom is a frame attachment member 13. The presently improved torque resisting strut and vibration damper 14 is shown operably mounted between the attachment members 12 and 13.

Figure 2:
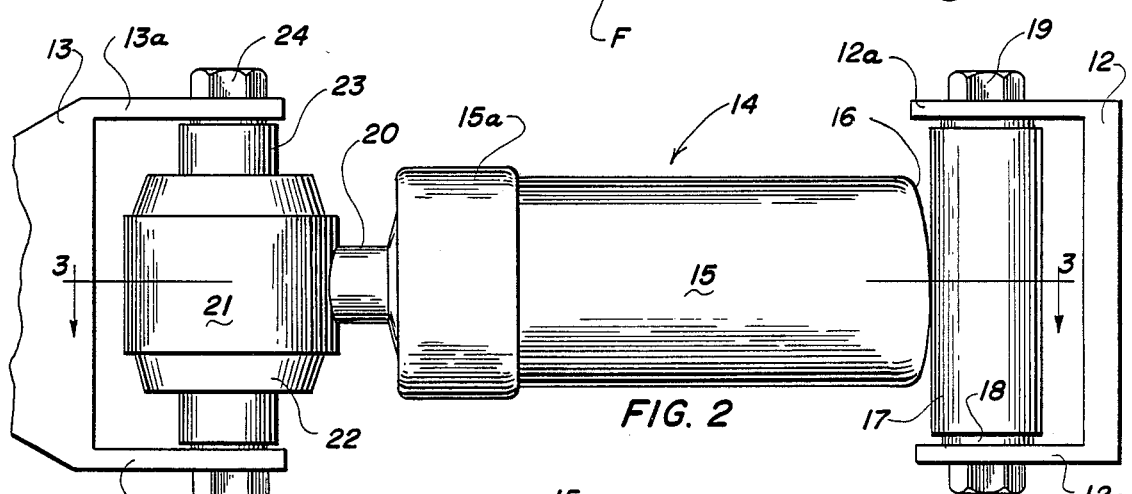
FIG. 2 is a longitudinal view of the present device as installed on an internal combustion engine mounted in a transverse position, the view being taken along line 2—2 in FIG. 1.

Turning now to FIG. 2 there is shown in a fragmentary view the engine attachment member 12 having flanges 12a which are spaced apart for a purpose to be pointed out. Similarly, the frame attachment member 13 is formed with flanges 13a which are in spaced relation and are generally in alignment with the flanges 12a on the engine attachment member 12. The modified hydraulic shock absorber 14 is formed with a cylindrical housing 15 having a closed end 16 to which an elongated tubular eye 17 is secured by welding or by other means. The tubular eye 17 is adapted to receive a spacer tube 18 which is clamped between the flanges 12a by a suitable bolt 19. It is noted that the spacer tube 18 is slightly longer than the eye 17 thereby permitting the eye 17 to rotate or pivot on the spacer tube 18.

The housing 15 is formed with an enlarged end 15a through which a piston rod 20 projects and on which piston rod there is an eye 21 which is adapted to receive a flexible bushing 22, and the bushing receives a spacer tube 23 which is of a sufficient length to span the distance between the flanges 13a on the frame attachment member 13. Clamping bolt 24 serves to retain the spacer tube 23 in operative position. Normally, the flexible bushing 22 is secured to both the eye 21 and to the spacer tube 23 to compensate for anticipated misalighment between attachment members 12 and 13 and to allow lateral tilt of the device 14 during operation.

The position of the hydraulic torque strut and damper in the manner shown in FIG. 2 is advantageous for the reason that there is no resilient mounting at the engine end, where the engine produces high temperature. The high heat has the effect of rapidly deteriorating resilient materials such as rubber. In the present arrangement, the bushing 22 is located at the vehicle frame where it is subjected to much lesser heat transmitted from the engine via the strut 14. Also it receives the benefit of air cooling during the operation of the vehicle.

Figure 3:
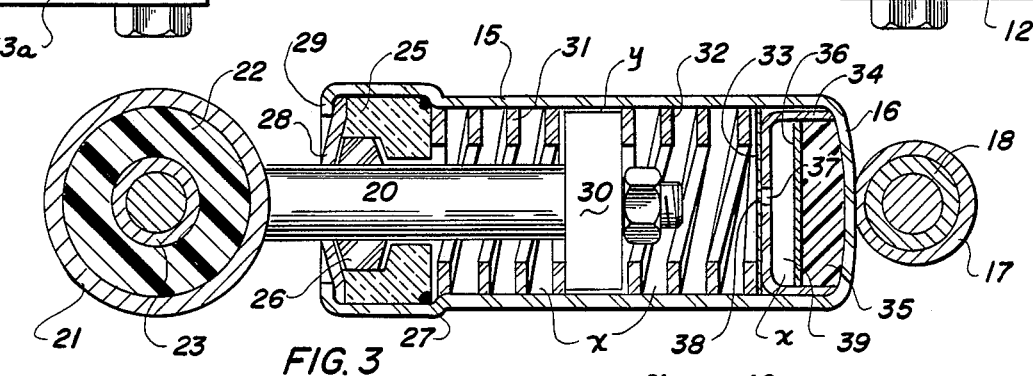
FIG. 3 is a longitudinal sectional view of the device illustrating the structural characteristics thereof as seen along line 3—3 in FIG. 2.

FIG. 3 illustrates the structural details of the hydraulic torque strut and vibration damper. In this view the piston rod 20 is slidably mounted in a rod guide 25 which also carries a suitable shaft seal 26. The guide 25 is secured in the enlarged portion 15a of the housing 15 against a seal ring 27 by means of a closure plate 28 which is held in position by peening over a flange 29. The piston rod 20 is attached to a piston 30 which is slidable in the housing 15, and the piston is engaged on one side by a first resilient spring member 31 which is butted against the guide 25, and by a second spring member 32 on the opposite side. The spring 32 butts against an orifice plate 33 which, in turn, is supported on a cup 34 which is turned so that its open end abutts the closed end 16 of the housing 15. The housing 15 and chamber 39 are completely filled with hydraulic fluid x for proper operation of strut 14. The cup 34 encloses a suitable compressible body 35 which may be formed of a closed cell neoprene sponge rubber and a backing plate 36. The closed cell body 35 provides a volume compensating function in the chamber 39 for one direction of movement of the piston toward that chamber, and it also functions for expelling the hydraulic fluid and returning it to the housing 15 during the opposite direction of movement of the piston.

The function of the backing plate 36 is to prevent damage to the compressible body 35 when fluid with high velocity enters into chamber 39. The cup 34 is formed with an opening 37 which is aligned with an orifice 38 formed in the plate 33. The orifice 38 may be sized so as to provide a controlled transfer of excess hydraulic fluid from housing 15 into chamber 39 without effecting the damping characteristics of the strut 14. This excess fluid is due to the reduction of space in housing 15 which is encountered when the piston is moving toward chamber 39. On the other hand, when the piston is moving in the opposite direction and the space of the housing 15 increases due to diminishing piston rod volume in housing 15, the chamber 39 must have sufficient amount of hydraulic fluid to compensate for the volume changes. The diameter of piston 30 is sized to the inside diameter of housing 15 such that the predetermined clearance y between them will act as a control orifice to achieve desired damping characteristics of strut 14.

During operation when the engine torque (caused by the engagement of transmission, acceleration, etc.) tries to pivot the engine about its mountings, one of the springs 31 or 32 (depending on the direction of movement) and the restricted fluid flow through clearance y will minimize this movement and will return the engine to its normal position after the torque diminishes. Furthermore, since strut 14 has the characteristics of a hydraulic shock absorber also, it will damp undesired engine vibration.

Figure 4:
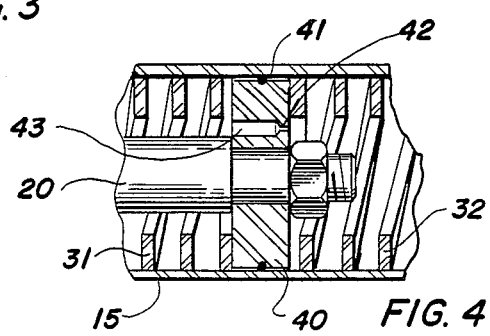
FIG. 4 is a modification of the torque resisting strut, the view being fragmentary and similar to FIG. 3.

Turning now to FIG. 4, there is illustrated in the fragmentary view a modification with respect to the torque strut and vibration damper. Specifically, the housing 15 which supports the piston rod 20 encloses a modified piston 40 which carries a well known type of seal 41 so as to block the flow of hydraulic fluid between opposite sides of the piston 40. This is different from what has been disclosed in FIG. 3. However, in order to permit a transfer of hydraulic fluid between opposite sides of the piston 40, there is formed an orifice 42 as part of a flow transfer passage 43 formed in the piston 40. The orifice 42 provides the same flow restricting effect as is evident from the construction in FIG. 3 where the control orifice is the predetermined clearance y between piston 30 and housing 15. The function of the orifice 42 is to control the piston velocity and the movement of piston 40 relative to the housing 15 when vibration or torque is imposed thereon by the internal combustion engine 10 during operation.

It can be appreciated from the foregoing disclosure that the torque strut and damper 14 differs from a conventional shock absorber in the arrangement of centering springs 31 and 32 on opposite sides of a piston. It is further pointed out that the springs, or an equivalent resilient means, have substantially equal rates for effecting the positioning of the piston. Without this arrangement of centering springs, the assembly 14 would not perform its intended function which is to react to torque produced by the internal combustion engine 10 so as to retain the engine in its original or substantially in its original position and damp engine vibration.

There is the further function performed by the springs 31 and 32 and that is that they retain the engine in its original position and constantly operate to return the engine to that original position in direct response to the torque generated by the engine.

A further particular function of the assembly 14 is that the provision of spacer tube 18 permits the assembly to angularly adjust itself thereby minimizing detrimental bending stresses thereon, and the provision of flexible bushing 22 which will compensate for anticipated misalignment between members 12 and 13. It is also important to locate the flexible bushing 22 in an area away from the hot engine where it will receive the benefits of incoming cooler air, since high temperature is detrimental to the life of the bushing material.

The above described preferred embodiments are intended to illustrate features of the invention which may be modified without departing from the scope of the invention.

What is claimed is:

1. In a vehicle having a frame and an engine carried in the frame in a predetermined position, the improvement of a passive engine torque resisting strut and vibration damper between the engine and the frame comprising:

(a) a housing having a closed end and means at said closed end providing a pivotal attachment for the engine and a closure mounted at the opposite end of said housing;

(b) a piston slidably received in said housing;

(c) a piston rod connected to said piston and slidably passing through said closure to the exterior of said housing;

(d) resilient attachment means on the piston rod for connection to the frame;

(e) a predetermined fixed quantity of hydraulic fluid in said housing disposed on opposite sides of said piston;

(f) resilient means in said housing in addition to said hydraulic fluid on opposite sides of said piston, said resilient means being assembled in said housing under a predetermined pre-load for normally centering said piston in said housing and yieldably resisting displacement of said piston under engine operating conditions tending to change the spacial distance between the engine and frame where the torque strut is attached, and the hydraulic fluid being transferred within said housing between opposite sides of said piston upon the displacement of said piston; and (g) hydraulic fluid transfer compensation means carried by said housing in position to communicate with said housing interior between said piston and said closed end of said housing, said compensation means accommodating the transfer of hydraulic fluid, in response to piston movement in said housing toward and away from said closed end of said housing, and including a wall having a port for fluid flow between said housing and said separate space, a compressible body in said separate space, and a protective surface between said compressible body and said port to receive the impact of the hydraulic fluid flow into said separate space.

2. The improvement set forth in claim 1 wherein said fluid transfer compensation means carried by said housing includes a volume compensating chamber in said housing at the side of said piston opposite to said piston rod, and means in said chamber to accommodate the volumetric displacement of said piston rod.

3. The improvement set forth in claim 2 wherein said volume compensating chamber is defined by a wall having an orifice opening between said housing and the chamber for the transfer of the hydraulic fluid upon piston displacement toward said chamber, and said means in said chamber is compressible closed cell rubber body and a backing for accommodating the hydraulic fluid transfer during piston displacement toward said chamber and for expelling the hydraulic fluid back to said housing upon the opposite direction of piston displacement.

4. The improvement set forth in claim 1 wherein said resilient means have substantially equal rates for effecting the positioning of said piston in a position with the forces of said resilient means substantially equal for returning the engine to its predetermined position.

5. In a vehicle having a frame and an engine carried by the frame in a predetermined position in the frame, the improvement of a combined engine torque resisting strut and vibration damper comprising:

(a) a housing; means pivotally connecting said housing to the engine; a piston movable in said housing;

(b) a piston rod projecting to the exterior of said housing;

(c) resilient means pivotally connecting said piston rod to the vehicle frame;

(d) torque resisting resilient means in said housing on opposite sides of said piston under pre-load for normally retaining the engine in a predetermined position and resisting engine movement from said predetermined position due to torque reaction;

(e) a predetermined fixed quantity of hydraulic fluid in said housing disposed on opposite sides of said piston; and (f) hydraulic fluid flow restricting means operative upon piston movement in said housing to impose reistance upon the piston movement, said flow restrictive means having an enclosure in said housing separating off a limit volume space and having ported communication with the housing, a compressible body in said space, a protective element adjacent said compressible body in line of fluid flow through said port upon piston movement toward said enclosure.

6. The improvement set forth in claim 5 wherein said means pivotally connecting said housing to the engine includes an attachment member on the engine, a tubular eye secured to said housing and a spacer tube attached to said attachment member and receiving said tubular eye to permit said tubular eye to move relative to said spacer tube.

7. In a vehicle with its engine mounted in the frame so engine torque and vibration affects the vehicle performance, the improvement of damper means passively sensing changes in engine torque and vibration which comprises:

(a) a housing forming a chamber having an open end and an opposite closed end;

(b) closure means for closing the open end of said housing;

(c) bracket means carried by the engine and by the frame in spaced opposed relation;

(d) first attachment means pivotally supporting one end of said housing by one of said bracket means;

(e) a piston and piston rod operably mounted in said housing with said piston rod projecting through said housing closure means;

(f) second attachment means pivotally supporting said housing through connection with said piston rod projecting through said housing closure means;

(g) resilient means in said housing in position engaging said piston from opposite sides under a preload for normally retaining said piston in a position to resist engine displacement in opposite directions due to the response of said resilient means to engine torque;

(h) a body of a fixed quantity of fluid filling said housing and surrounding said piston so as to be responsive to piston movement relative to said housing for damping vibration between the engine and the frame, said fluid being displaced in said housing by said piston to flow to opposite sides of said piston and in a direction opposite to the direction of piston movement; and (i) means in said housing in position to provide a space separated from said housing chamber, said last means having an opening to said housing chamber for the passage of fluid into and out of said space to provide compensation for the fluid body in its responsive movement, and compressible means in said space to yield to the inflow of fluid and return the fluid to said chamber.

8. The improvement set forth in claim 7 wherein said piston operation in said housing controls the flow of the fluid between opposite sides of said piston for damping vibration between the engine and frame.

9. In a vehicle having a frame, an engine carried by the frame, an engine torque resisting and vibration damper operatively connected between the engine and the frame, the improvement in the damper comprising:
 (a) a damper housing having a closed end and an opposite open end;
 (b) closure means in said open end for sealing the housing interior;
 (c) a piston movable in said housing interior and having a piston rod extending through said closure means to the exterior;
 (d) resilient means in said housing engaged on opposite sides of said piston for pre-loading said piston to position it normally intermediate said closed end of said housing and said closure means;
 (e) means carried by said housing for defining a space separated from but having restricted communication with the housing interior, said means being constituted by a fixed wall having a restricted opening for communication with said housing interior;
 (f) a compressible body in said separate space for varying the volume of the space, said body having a size normally occupying a predetermined volume of the space and being operative selectively to increase and decrease the volume of said separate space upon compression and expansion respectively thereof;
 (g) movable means operably disposed in said separate space between said fixed wall and said compressible body for protecting said compressible body from fluid flowing through said restricted opening under pressure from said piston movement forcing fluid toward said restricted opening; and
 (h) a body of hydraulic fluid substantially filling the space in said housing on opposite sides of said piston and filling said separate space by a predetermined amount, said body of hydraulic fluid responding to relative movement between said piston and housing to flow to either side of said piston and said compressible body providing a hydraulic fluid volume compensating reaction by compressing to increase the volume of said space for piston movement toward said space to permit entry of hydraulic fluid into said space, and to force return of hydraulic fluid to said housing interior on expansion upon opposite piston movement.

10. The improvement set forth in claim 9 wherein said compressible body is a closed cell body adapted for changing its size to accommodate said hydraulic fluid entering said space.

* * * * *